Z. MANGUM.
OVERSHOE FOR HORSES.
APPLICATION FILED MAR. 13, 1911.
991,864.
Patented May 9, 1911.
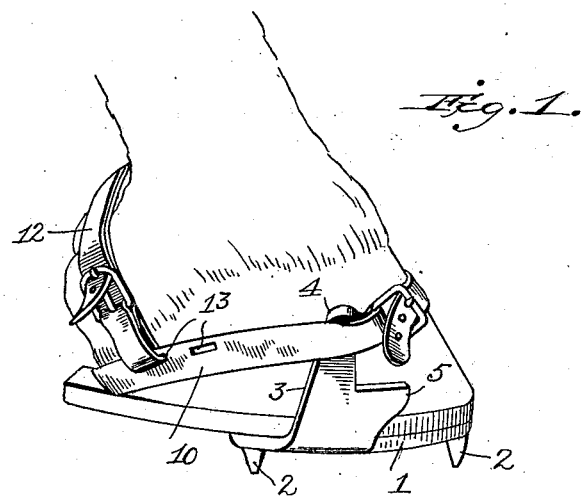
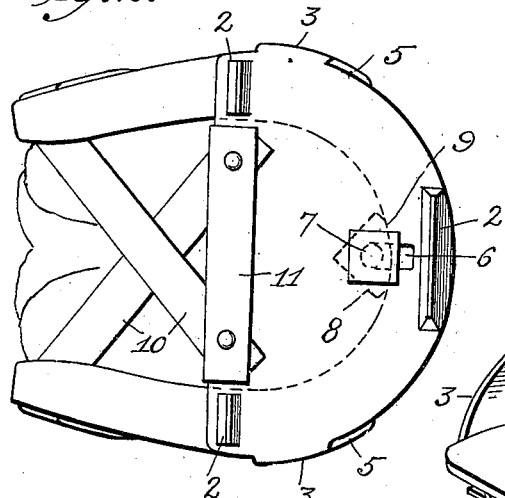
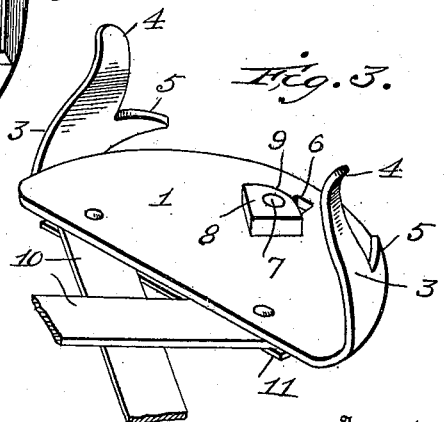

UNITED STATES PATENT OFFICE.

ZACHARIAH MANGUM, OF SILVER SPRINGS, MARYLAND.

OVERSHOE FOR HORSES.

991,864.     Specification of Letters Patent.     Patented May 9, 1911.

Application filed March 13, 1911. Serial No. 614,138.

*To all whom it may concern:*

Be it known that I, ZACHARIAH MANGUM, a citizen of the United States, and resident of Silver Springs, in the county of Montgomery and State of Maryland, have invented certain new and useful Improvements in Overshoes for Horses, of which the following is a specification.

The invention relates to improvements in overshoes which are temporarily placed over the permanent shoes of a horse to prevent slipping.

It consists in the novel construction, combination and arrangement of parts hereinafter described, pointed out in the appended claims and illustrated in the accompanying drawings.

In the drawings, in which similar reference characters designate corresponding parts, Figure 1 is a side elevation of an over-shoe embodying the invention. Fig. 2 is a plan view of the underside. Fig. 3 is a detail perspective view showing the base-plate.

The base-plate 1 is of a size and shape to fit the forward part of the hoof beneath the permanent shoe. Projecting from the under surface of the base-plate are the toe and side calks 2. Projecting upwardly from the side edges of the base plate are the side pieces 3 integral with the base-plate. These side pieces are shaped to fit over the hoof and at their extreme upper ends they are flared outwardly to form shallow hooks 4. Projecting from the forward edges of the side pieces 3 are the spurs 5 integral with the side pieces. In the toe of the base-plate 1, back of the toe-calk 2, is the slot 6 through which passes the bolt 7 with its head on the under side of the base-plate. On the upper end of the bolt above the base-plate is the nut 8 with the beveled edge 9. To the rear edge of the base-plate 1 are fastened the ends of the holding straps 10 by the clamping-bar 11 riveted to the under side of the base-plate. The holding straps are connected by the adjusting strap 12 passing through the holes 13 in the holding straps. There are several of these holes in each holding strap so that the adjusting strap can be placed to meet different requirements.

In securing the over-shoe to the hoof, the nut 8 is turned to loosen the bolt 7 and the latter is moved to the rear of the slot 6, the over-shoe is then placed over the bottom of the hoof with the sides of the hoof pressing against the side-pieces 3 and spurs 5. These side pieces and spurs are somewhat to the front of the base-plate to form a pocket for the toe of the hoof and serve to take up the forward thrust of the hoof against the over-shoe. When the over-shoe is first fitted to the hoof the side-pieces 3 and spurs 5 are bent inwardly to shape the over-shoe to the toe of the hoof. By reason of the inward inclination of the side-pieces and spurs the over-shoe is also held against the bottom of the hoof. The points of the spurs enter slightly into the substance of the hoof and further aid in holding the over-shoe in place.

After the over-shoe is placed over the bottom of the hoof with the toe pressed against the side-pieces and spurs, the bolt 7 is moved to the forward end of the slot with the beveled edge 9 of the nut 8 bearing against the inner edge of the permanent shoe. The bolt is then turned to tighten the nut and firmly clamp the bolt to the base-plate. This bolt clamped to the base-plate with the nut bearing against the inner edge of the permanent shoe, holds the over-shoe against the backward thrust of the hoof in the over-shoe. The holding straps 10 are then crossed as shown in Fig. 2 and are carried around the heel of the hoof above the ends of the heel of the permanent shoe, under the shallow hooks 4 to the front of the hoof where the straps are buckled. The shallow hooks prevent any upward movement of the straps on the side-pieces. The adjusting strap 12 is then tightened over the top of the heel of the hoof to prevent the holding strap from slipping forward under the hoof. If the permanent shoe has projecting heels the adjusting strap is not necessary, but should the heels of the permanent shoe be short the holding straps 10 would have a tendency to slip forward beneath the hoof, which tendency would be prevented by the adjusting strap. By means of the several holes 13 the adjusting strap can be placed to accommodate the shape of the hoof. When so attached to the hoof the over-shoe will be firmly secured in place against either a forward or rearward thrust of the hoof in the over-shoe and against any tendency of the hoof to leave the over-shoe.

Having thus described my invention, what I claim and desire to secure by Letters Patent is:

1. In an over-shoe for horses, a base-plate to fit beneath the toe of the hoof, side-pieces projecting upwardly from the sides of the base-plate, spurs projecting from the forward edges of said side pieces, a bolt adjustable in the toe of the base-plate to bear against the inner edge of the permanent shoe, and holding straps attached to the rear edge of the base-plate adapted to pass over the heel of the hoof around the upper ends of said side-pieces to the front of the hoof.

2. In an over-shoe for horses, a base-plate to fit beneath the toe of the hoof, side-pieces projecting upwardly from the sides of the base-plate having shallow hooks at their upper ends, a bolt adjustable in the toe of the base-plate to bear against the inner edge of the permanent shoe, and holding straps attached to the rear edge of the base-plate adapted to pass over the heel of the hoof around said shallow hooks to the front of the hoof.

3. In an over-shoe for horses, a base-plate to fit beneath the toe of the hoof, side-pieces projecting upwardly from the sides of the base-plate having shallow hooks in their upper ends, spurs projecting from the forward edges of said side-pieces, a bolt adjustable in the toe of the base-plate to bear against the inner edge of the permanent shoe, holding straps attached to the rear edge of the base-plate adapted to pass over the heel of the hoof around said shallow hooks to the front of the foot, and an adjusting strap connecting the holding straps over the heel of the hoof.

In testimony whereof I affix my signature in the presence of two subscribing witnesses.

ZACHARIAH MANGUM.

Witnesses:
HUGH M. STERLING,
CHAS. J. O'NEILL.

---

Copies of this patent may be obtained for five cents each, by addressing the "Commissioner of Patents, Washington, D. C."